Sept. 1, 1925.  1,551,825
W. E. HARVEY
RESERVE WATER SUPPLY DEVICE
Filed Dec. 20, 1923  2 Sheets-Sheet 1
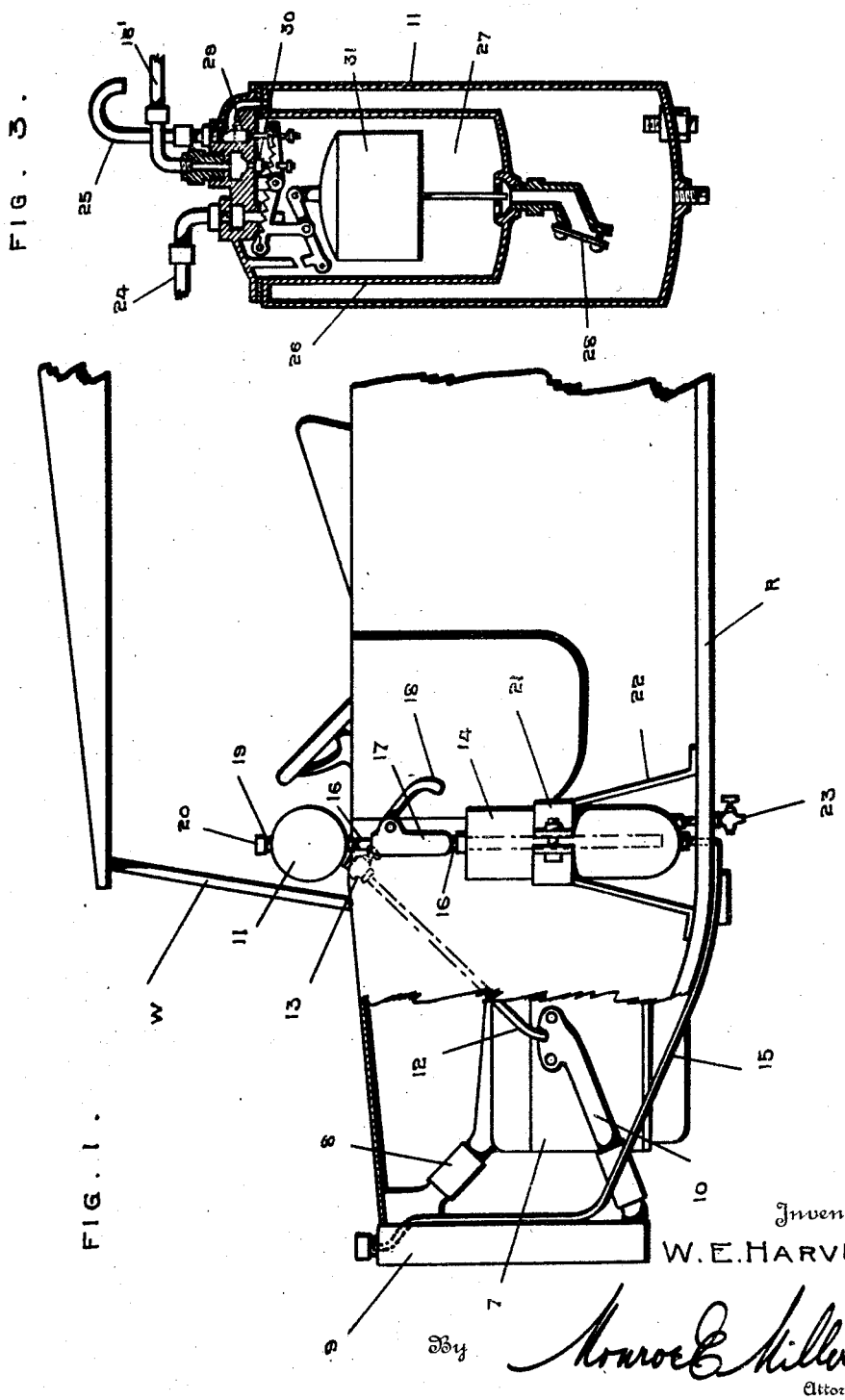
Inventor:
W. E. HARVEY,
By Monroe E. Miller
Attorney.

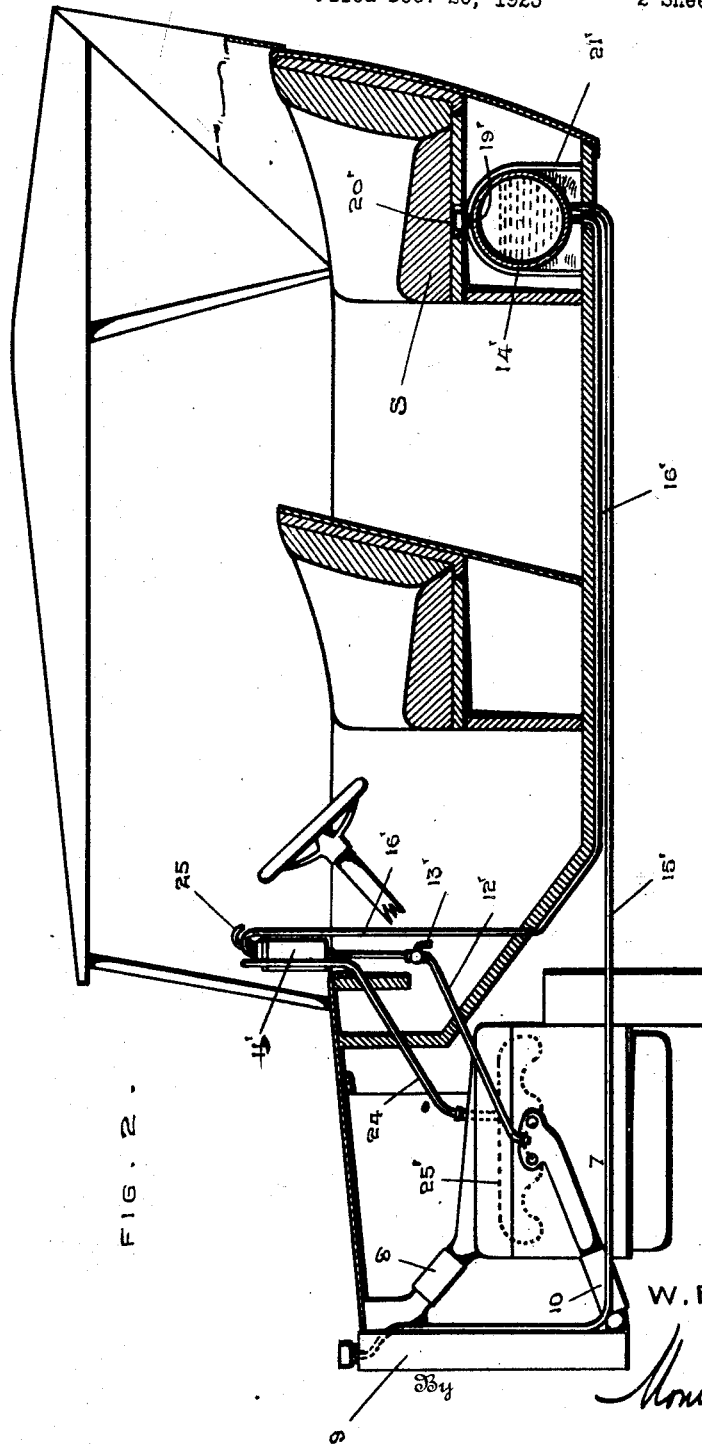

Patented Sept. 1, 1925.

1,551,825

UNITED STATES PATENT OFFICE.

WALTER E. HARVEY, OF MERIDIAN, MISSISSIPPI.

RESERVE-WATER-SUPPLY DEVICE.

Application filed December 20, 1923. Serial No. 681,894.

*To all whom it may concern:*

Be it known that I, WALTER E. HARVEY, a citizen of the United States, residing at Meridian, in the county of Lauderdale and State of Mississippi, have invented certain new and useful Improvements in Reserve-Water-Supply Devices, of which the following is a specification, reference being had therein to the accompanying drawing.

The present invention relates to a reserve water supply device for motor vehicles, and aims to provide a novel and simple device for carrying a reserve supply of water in a motor vehicle to replenish the water in the engine cooling system when same becomes low.

Another object is the provision of such a device which will utilize the overflow and water vapor discharged from the engine cooling system, so as to conserve the water.

It is also an object of the invention to provide such a device which is simple and inexpensive in construction, and which can be readily installed.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompany drawings, wherein—

Figure 1 is a fragmentary view of an automobile showing one form of the improved device installed.

Fig. 2 is a fragmentary view of an automobile showing another form of the device installed therein.

Fig. 3 is a sectional view of the vacuum tank.

In the drawings, there is shown, in both Figs. 1. and 2, the internal combustion engine 7 of a motor vehicle having the hot water outflow connection 8 with the upper portion of the water cooling radiator 9 and the return connection 10 with the lower portion of the radiator, for the circulation of the water through the engine jacket and radiator, in the well known manner. In making long trips, it frequently happens the water in such cooling system becomes low, owing to the water being vaporized by the heat, and resulting in an over-heated engine. The radiator thus requires filling, and it is not always possible to have water accessible when required, so that the engine if run while over-heated may become injured or ruined.

The present appliance includes a water supply tank 11 disposed at a height with its bottom above the normal or highest water level in the radiator 9 of the engine cooling system, and, as shown, said tank is disposed behind the windshield W. The water thus flows by gravity from the tank 11 through a tube or pipe 12 which has its upper end connected to the bottom of the tank 11. The lower end of said pipe is connected to the return connection 10 at the water inlet of the engine jacket, and said pipe 12 is preferably provided with a hand valve 13 at a point where it is conveniently accessible to the operator so that said valve can be closed and opened conveniently.

A reserve water tank 14 is disposed below the tank 11 for holding a quantity of water in reserve, to replenish the supply in the engine cooling system. The tank 14 also receives the overflow and water vapor from the engine cooling system. Thus, the overflow tube or pipe 15 which terminates at its upper end within the upper portion of the radiator 9, is connected at its lower end with the bottom of the tank 14, whereby the water and water vapor which pass from the radiator through the overflow pipe 15 will enter the tank 14. The water which escapes from the radiator is thus caught in the tank 14, and steam and water vapor which pass through the pipe 15 will also enter the tank 14, the steam being condensed in passing up through the cold water in said tank. This conserves the water, so that refilling of the tanks and radiator is not required so often as usual.

The water is raised from the tank 14 into the tank 11 so as to flow by gravity through the pipe or tube 12 into the water jacket of the engine, it being noted that the tank 14 is sufficiently low down that the water can flow by gravity in the pipe 15 from the upper portion of the radiator 9 to the tank 14. Thus, the tank 14 is below the normal water level of the engine cooling system while the tank 11 is above such water level. A pipe 16 extends down into the tank 14 close to the bottom thereof and is connected at its upper end to the bottom of the tank 11 for the upward flow of water from the lower tank 14 into the upper tank. A pump 17 is disposed in the pipe 16, for pumping the water from the lower into the upper tank, and, as shown, said pump is a manually operable one, being provided with the hand lever 18 which can be oscillated for raising the water into the upper tank. A mechanically operated pump can be used, however.

The upper tank 11 has a filling neck 19 normally closed by a removable cap 20, whereby the tanks can be filled when starting on a long trip, in order that sufficient water can be carried to keep the cooling system supplied.

As shown, the lower tank 14 is supported at one side of the car body above the running board R. Thus, the tank 14 is held in a clamp or band 21 which embraces the tank, and said clamp has legs 22 secured on the running board. The pipe or tube 15 extends through the running board, and the tank 14 also has a drain valve 23 which can extend down through the running board, for draining the tanks when the valve 23 is opened.

When the water in the radiator 9 becomes low, the valve 13 can be opened to permit water to flow by gravity from the tank 11 into the water jacket of the engine to fill the water cooling system. If the tank 11 is empty, then the pump 17 is operated to raise water from the tank 14 into the tank 11. The water which overflows from the radiator 9 through the pipe 13 reenters the tank 14, and steam and water vapor which are discharged from the radiator also pass through the pipe 15 into the tank 14, the steam being condensed in passing up through the cold water in said tank. This avoids the waste of water.

Fig. 2 shows the reserve water tank 14' disposed in the vehicle body under one of the seats, and held by the clamps 21' with the filling neck 19' and cap 20' under the seat cushion S so as to be accessible when said cushion is removed, for filling the tank.

A vacuum tank 11' is used for supplying the water by gravity to the cooling system, and such tank is the same as extensively used in motor vehicles for the supply of gasoline to the carburetor.

The tank 11' is supported from the windshield or other suitable support so as to be at a higher level than the water jacket of the engine, and a pipe 12' connects the bottom of the tank 11' with the return connection 10 and has a valve 13'. A tube or pipe 16' connects the bottom of the tank 14' with the top of the tank 11', and a tube or pipe 24 connects the top of the tank 11' with the intake manifold 25' of the engine, whereby the suction in said manifold extends through the tube 24 into the tank 11'. The tank 11' has an air vent 25, and an inner chamber 26 is provided in the tank from which the water flows into the lower or outer chamber 27 past the check valve 28. Valves 29 and 30 are provided for shutting off the flow between the chamber 26 and the vent 25 and tube 16', respectively, and a float 31 movable in the chamber 26 is operably connected with said valves in the well known manner.

When it is desired to supply water to the cooling system of the engine, the valve 13' is opened, and the water in the chamber 27 flows by gravity through the pipe 12' into the water jacket. The water in the chamber 26 flows by gravity into the chamber 27, and when the float 31 moves downwardly to a predetermined position, the valve 30 is opened and the valve 29 closed, whereby the suction from the tube 24 will extend through the tube 16' and draw the water from the tank 14' into the chamber 26. The water is thus elevated from the tank 14' into the tank 11' at a higher level, for the flow of water by gravity from the tank 11' into the cooling system. When the chamber 26 is filled, the float 31 being raised will close the valve 30 and open the valve 29, thereby shutting off the flow of water into the chamber 26 and opening the vent so that the water in the chamber 26 can flow down into the chamber 27. When the valve 13' is closed, the operation of the vacuum tank is stopped as soon as the chambers 26 and 27 are both filled, and said chambers will remain filled to supply water to the engine jacket as soon as the valve 13' is opened.

Having thus described the invention, what is claimed as new is:—

1. The combination with an internal combustion engine and its water cooling system, of a water tank disposed with its bottom above the highest water level in said system, a connection between said tank and system including a manually operable valve for the gravity flow of water from said tank to said system when the valve is opened, a second tank disposed below said water level, an overflow pipe leading from said system and connected to the second tank, and a connection between said tanks including a pump for raising the water from the second tank into the first-named tank.

2. The combination with an internal combustion engine and its water cooling system, of a water tank disposed with its bottom above the highest water level in said system, a connection between said tank and system including a manually operable valve for the gravity flow of water from said tank to said system when the valve is opened, a second tank disposed below said water level, an overflow pipe leading from said system and connected to the second tank, and means for raising water from the second tank into the first-named tank.

In testimony whereof I hereunto affix my signature.

WALTER E. HARVEY.